3,257,385
5'-SUBSTITUTED STEROIDAL PYRAZOLES
Ralph F. Hirschmann, Scotch Plains, and Gerald J. Kent, Princeton, N.J., assignors to Merck & Co., Inc., Rahway, N.J., a corporation of New Jersey
No Drawing. Filed Apr. 14, 1964, Ser. No. 359,787
12 Claims. (Cl. 260—239.5)

This invention is concerned generally with novel 5'-substituted-[3,2-c]pyrazole compounds of the pregnane series, and with processes of preparing the same. More particularly, it relates to novel 5'-substituted-21-hydroxy-, 21-acyloxy-, 21-phosphate, 21-desoxy-, and 21-halo-17α-hydroxy - 20 - oxo - 4 - pregneno - (and 4,6 - pregnadieno)-[3,2-c]pyrazoles and to processes of making these compounds starting from the corresponding 17α,21-dihydroxy-4-pregnene-(or 4,6-pregnadiene)-3,20-dione.

These novel [3,2-c]pyrazole compounds of the pregnane series which are the subject of the present invention may be chemically represented by structures A and B:

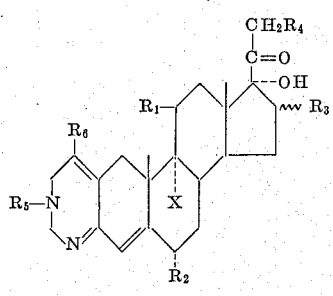

A

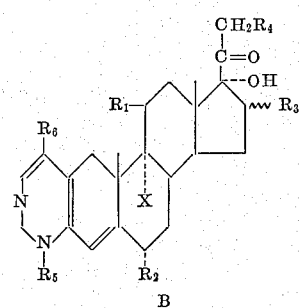

B wherein $R_1$ is hydrogen, β-hydroxy, or keto,
$R_2$ is hydrogen, α-fluoro, or α-methyl,
$R_3$ is hydrogen, α-methyl, β-methyl, or methylene,
$R_4$ is hydrogen, hydroxy, acyloxy, chloro, fluoro, the dihydrogen phosphate and the alkali metal salts of said dihydrogen phosphate,
$R_5$ is hydrogen, alkyl, cycloalkyl, acyl, aralkyl, aryl, a heterocyclic nucleus or substituted derivatives thereof,
$R_6$ is carbonyl, alkoxycarbonyl, hydroxymethyl and methyl, and
X is hydrogen or halogen.

N-substituted-pyrazole compounds having structure "A" are herein designated as the 1'-substituted-[3,2-c]-pyrazoles, and N-substituted-pyrazole compounds having structure "B" are designated as the 2'-substituted [3,2-c]-pyrazoles.

The above defined [3,2-c]pyrazole compounds produced in accordance with the present invention possess high anti-inflammatory activity, and are especially effective for the treatment of arthritis and related diseases since they can be administered for their cortisone-like action in low dosage thereby minimizing undesirable side effects.

In preparing our novel chemical compounds the starting material utilized is a 17α,21-dihydroxy-4-pregnene-3,20-dione which may be identified by the following structural formula (or the $\Delta^{4,6}$-analogue):

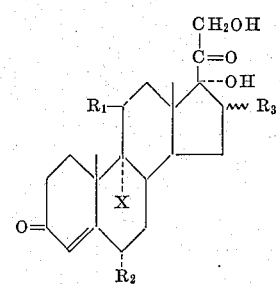

wherein $R_1$ is hydrogen, β-hydroxy or keto,
$R_2$ is hydrogen, α-fluoro or α-methyl,
$R_3$ is hydrogen, α-methyl, β-methyl or methylene, and
X is hydrogen or halogen.

However, it is clear to those skilled in the art that other starting materials may be similarly converted to the desired end products.

The above named starting materials for our invention can be prepared by the introduction of the various substituents, namely the 16α-methyl, 16β-methyl, 16-methylene, 6α-methyl, 6α-fluoro, or the 9α-fluoro groups into a 17α,21 - dihydroxy - 4 - pregnene - 3,20 - dione according to known procedures capable of general application. More than one substituent may be introduced into the unsubstituted steroid in any order, although it is generally preferred to introduce a 9α-halogen substituent last. The $\Delta^{4,6}$-steroids can be prepared from the corresponding $\Delta^4$-steroid by reaction with selenium dioxide.

The starting materials defined above will react aqueous formaldehyde solutions in the presence of strong acid to form the corresponding 17α,20,20,21-bis(methylenedioxy) derivatives (Compound I of Flow Sheet). Upon reaction of the latter compound with dialkyl oxalate there is formed the 2-alkoxalyl-derivative (Compound II). When starting with a 11β-hydroxy-steroid the 11β-alkoxalyloxy-derivative is formed.

The 17α,20,20,21 - bis(methylenedioxy) - 2 - alkoxalyl-4 - pregnene - (or 4,6 - pregnadiene) - 3 - one compound reacts with hydrazine in an inert atmosphere to form the corresponding 17α,20,20,21 - bis(methylenedioxy) - 5'-alkoxycarbonyl - 4 - pregneno - (or 4,6 - pregnadieno) [3,2-c]pyrazole (Compound III).

Upon treatment of the 17α,20,20,21-bis(methylenedioxy)-2-alkoxalyl-steroid with a monosubstituted hydrazine, the corresponding N-substituted-4-pregneno- (or 4,6-pregnadieno)-[3,2-c]pyrazole compounds are formed. The N-substituted [3,2-c]pyrazoles having structure "A," as shown in Flow Sheet Compound IIIA, are designated as the 1'-substituted [3,2-c]pyrazoles, and the N-substituted-pyrazole compounds having structure "B," as shown in IIIB, are designated as the 2'-substituted-[3,2-c]pyrazoles.

Among the monosubstituted hydrazines which may be used for the process of our invention are; alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines, o-, m-, and p-tolyhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, and 2-hydrazinopyrimidine; aralkylhydrazines, such as benzylhydrazine and phenylethylenehydrazine.

There are thus produced the corresponding N-substituted-4-pregneno- (or 4,6-pregnadieno)-[3,2-c]pyrazoles including: N-alkyl such as N-methyl, N-ethyl, N-butyl, N-propyl, N-(β-hydroxyethyl), N-cycloalkyl, N-aryl which may be derived from any aromatic nucleus, including N-phenyl and the N-substituted-phenyl derivatives such as o-, m-, and p-halophenyl; o-, m-, and p-tolyl-; o-, m-, and p-alkoxyphenyl-, o-, m-, and p-nitrophenyl; N-(1″-naphthyl)-, N-(2″-pyridyl)-, N-(3″-pyridyl), N-(4″-pyridyl), N-(4″-pyridyloxide), N-2″-pyrimidyl)-; N-aralkyl-, such as N-benzyl- and N-phenylethenyl-4-pregneno- (or 4,6-pregnadieno)-[3,2-c]pyrazoles. The N-alkyl-[3,2-c]pyrazoles may also be prepared by direct alkylation of the N-unsubstituted-[3,2-c]pyrazoles.

The 5′-alkoxycarbonyl-derivative (Compound III) is reacted with an alcoholic solution of an inorganic base, such as potassium hydroxide, to form the corresponding 17α,20,20,21 - bis(methylenedioxy) - 5′ - carboxy - 11β-hydroxy - 4 - pregneno - (or 4,6 - pregnadieno) - [3,2-c] pyrazole (Compound IV).

The 5′-alkoxycarbonyl-derivative (Compound III) is heated with lithium aluminum hydride in a solvent to form the corresponding 17α,20,20,21-bis(methylenedioxy) - 5′ - hydroxymethyl - 11β - hydroxy - 4 - pregneno- (or 4,6-pregnadieno)-[3,2-c]pyrazole (Compound V). The latter compound is transformed into the corresponding 5′-methyl compound by first converting to the 5′-tosyl-derivative, for example, by letting stand with p-toluene sulfonyl chloride for several hours at room temperature, and then refluxing the tosyl derivative with lithium aluminum hydride in pyridine solution for about 4 hours.

Upon treatment of any of the above described 17α,20,20,21-bis(methylenedioxy) compounds with a dilute organic acid, for example, a 60% aqueous solution of formic acid, the 17α,20,20,21-bis(methylenedioxy)-protecting group is removed and there is obtained the corresponding 17α,21 - dihydroxy - 20 - oxo - 4 - pregneno- (or 4,6-pregnadieno)-[3,2-c]pyrazoles, which are represented by Compound IX of the Flow Sheet.

Any acyl groups present at $R_4$ and/or at $R_5$ may be removed by treating the steroid with sodium methoxide in methanol at room temperature. Acyl groups present at the $R_4$ position may be selectively removed by treatment with aqueous acetic acid.

The 11β-hydroxy-5′-substituted-4-pregneno (or 4,6-pregnadieno)-[3,2-c]pyrazoles which have a 9α-halo-substituent are preferably prepared by the following alternate route: Using the procedures described above, the 17α,20,20,21 - bis(methylenedioxy) - 9α - halo - 11β-hydroxy - 4 - pregnene - (or 4,6 - pregnadiene) - 3 - one (Compound I) is oxidized to the 17α,20,20,21 - bis(methylene dioxy) - 9α - halo - 4 - pregnene - (or 4,6 - pregnadiene)-3,11-dione, which is reacted sequentially with the dialkyl oxalate, and then with hydrazine or a monosubstituted hydrazine, to give the corresponding 9α-halo-11-oxo-5′-substituted [3,2-c]pyrazole compound, which then undergoes the various transformations shown in the Flow Sheet. The [3,2-c]pyrazoles can be reduced to the corresponding 9α - halo - 11β - hydroxy - 5′ - substituted [3,2-c]pyrazole, for example, by adding a saturated solution of sodium borohydride to a solution of the steroid in a mixture of triethylamine and isopropyl alcohol, to which we prefer to add a little water, and allowing the mixture to stand overnight.

The compounds of our invention include, among others, the following:

the 5′-carboxy,
5′-alkoxycarbonyl,
5′-hydroxymethyl, and
5′-methyl derivatives of 11β,17α,21-trihydroxy-20-oxo-
    4-pregneno-[3,2-c]pyrazole, 11β,17α,21-trihydroxy-16α-methyl-20-oxo-4-pregneno-
    [3,2-c]pyrazole,
11β,17α,21-trihydroxy-16β-methyl-20-oxo-4-pregneno-
    [3,2-c]pyrazole,
11β,17α,21-trihydroxy-16-methylene-20-oxo-4-
    pregneno-[3,2-c]pyrazole,
11β,17α,21-trihydroxy-6α-methyl-20-oxo-4-pregneno-
    [3,2-c]pyrazole,
11β,17α,21-trihydroxy-6α,16β-dimethyl-20-oxo-4-
    pregneno-[3,2-c]pyrazole,
11β,17α,21-trihydroxy-6α-methyl-16-methylene-20-
    oxo-4-pregneno-[3,2-c]pyrazole,
6α-fluoro-11β,17α,21-trihydroxy-20-oxo-4-pregneno-
    [3,2-c]pyrazole,
6α-fluoro-11β,17α,21-trihydroxy-16α-methyl-20-oxo-
    4-pregneno-[3,2-c]pyrazole,
6α-fluoro-11β,17α,21-trihydroxy-16β-methyl-20-oxo-
    4-pregneno-[3,2-c]pyrazole,
6α-fluoro-11β,17α,21-trihydroxy-16-methylene-20-
    oxo-4-pregneno-[3,2-c]pyrazole,
9α-fluoro-11β,17α,21-trihydroxy-20-oxo-4-pregneno-
    [3,2-c]pyrazole,
9α-fluoro-11β,17α,21-trihydroxy-16α-methyl-20-oxo-
    4-pregneno-[3,2-c]pyrazole,
9α-fluoro-11β,17α,21-trihydroxy-16β-methyl-20-oxo-
    4-pregneno-[3,2-c]pyrazole,
9α-fluoro-11β,17α,21-trihydroxy-16-methylene-20-
    oxo-4-pregneno-[3,2-c]pyrazole,
9α-fluoro-11β,17α,21-trihydroxy-6α-methyl-20-oxo-
    4-pregneno-[3,2-c]pyrazole,
9α-fluoro-11β,17α,21-trihydroxy-6α,16α-dimethyl-20-
    oxo-4-pregneno-[3,2-c]pyrazole,
9α-fluoro-11β,17α,21-trihydroxy-6α,16β-dimethyl-20-
    oxo-4-pregneno-[3,2-c]pyrazole,
9α-fluoro-11β,17α,21-trihydroxy-6α-methyl-16-
    methylene-20-oxo-4-pregneno-[3,2-c]pyrazole,
6α,9α-difluoro-11β,17α,21-trihydroxy-20-oxo-4-
    pregneno-[3,2-c]pyrazole,
6α,9α-difluoro-11β,17α,21-trihydroxy-16α-methyl-20-
    oxo-4-pregneno-[3,2-c]pyrazole,
6α,9α-difluoro-11β,17α,21-trihydroxy-16β-methyl-20-
    oxo-4-pregneno-[3,2-c]pyrazole,
6α,9α-difluoro-11β,17α-21-trihydroxy-16-methylene-
    20-oxo-4-pregneno-[3,2-c]pyrazole;

the corresponding 11-desoxy and 11-oxo-derivatives; and the $\Delta^{4,6}$-analogues of all of the aforesaid compounds; as well as the 1′- and 2′-acyl, alkyl, aralkyl, aryl, derivatives thereof.

The N-acyl-21-acylate derivatives of the above described 17α,21 - dihydroxy-20-oxo-5′-substituted-4-pregneno-(or 4,6 - pregnadieno)-[3,2-c]pyrazoles in which both acyl groups are the same (Compounds XIIA and XIIB) may be prepared by reacting a 17α,21-dihydroxy-20 - oxo - 5′-substituted-4-pregneno-(or 4,6-pregnadieno)-[3,2-c]pyrazole in which $R_5$ is hydrogen with two equivalents of an acylating agent. The 21-acyl derivatives of the above described pyrazoles in which $R_5$ is H may be prepared by heating an N-acyl-17α,21-dihydroxy-20-oxo - 5′ - substituted-4-pregneno-(or 4,6-pregnadieno)-[3,2-c]pyrazole 21-acylate with aqueous acetic acid, whereupon the N-acyl group is selectively removed.

Acylating agents which can be used for this purpose include a lower hydrocarbon carboxylic acid acylating agent such as benzoic anhydride, tertiary butyl acetyl chloride; a lower alkanoic anhydride or lower alkanoyl halide such as acetic anhydride, propionic anhydride or acetyl chloride; or a polybasic anhydride such as β,β-dimethyl-glutaric anhydride, succinic anhydride and the like, in the presence of an organic base such as pyridine.

The 17α,21 - dihydroxy - 20 - oxo-5′-substituted-4-pregneno-(or 4,6-pregnadieno)-[3,2-c]pyrazole (Compound IX) is reacted with methane sulfonyl chloride in a non-aqueous base to form the 21-mesylate (Compound X).

A steroid in which $R_5$ is hydrogen is first converted to the N-carbamyl derivative before undergoing this reaction.

The 21-mesylate is heated with an alkali iodide to form the 21-iodo-compound (Compound XI). In a preferred method for carrying out this reaction, sodium iodide is added to the steroid dissolved in acetone and the resulting mixture is heated at reflux temperature for approximately one hour.

The 21-iodo-20-oxo-5′-substituted-4-pregneno-(or 4,6-pregnadieno)-[3,2-c]pyrazole is heated with an alkali bisulfite in a solvent to form the corresponding 21-desoxy-compound (Compound XIV). A preferred method is to add sodium bisulfite to a suspension of the steroid in aqueous ethanol and then heat the mixture under reflux for a period of about an hour. Any carbamyl group present at $R_5$ may be removed by treating the steroid in glacial acetic acid with sodium nitrite.

Thus the novel compounds of our invention which are formed from the above reaction include the 21-desoxy derivatives of all of the compounds listed in columns 3 and 4.

The 21 - fluoro - 17α - hydroxy - 20 - oxo - 5′ - substituted-4-pregnano-(and 4,6-pregnadieno)-[3,2-c] pyrazoles (Compound XIII) are prepared from the corresponding 21-mesylate by heating with an alkali fluoride in a solvent to form a mixture of a 17α,21-epoxy-compound and the corresponding 21-fluoro compound. These compounds are separated by partition chromatography, or by chromatography on a weak adsorbent such as silica gel. There are thus obtained the 21-fluoro-analogues of all of the 21-hydroxy compounds named in columns 3 and 4.

The 21 - chloro - 17α - hydroxy - 20 - oxo - 5′ - substituted-4-pregneno-(and 4,6-pregnadieno)-[3,2-c]pyrazoles (Compound XIII) are prepared from the corresponding 21-mesylate by heating with lithium chloride, conveniently in a solvent such as dimethylformamide for about one hour. There are thus obtained the 21-chloro-analogues of all of the 21-hydroxy-compounds named in columns 3 and 4.

The 21-dihydrogen phosphate esters (Compound XV) of all of the 21-hydroxy-compounds listed in columns 3 and 4, are prepared by the reaction of the corresponding 21-iodo compound (Compound XI) with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_5$=acyl) into the free amine ($R_5$=H) dialkali metal salt from which the dihydrogen phosphate can be obtained by contacting with an ion exchange resin.

All of the [3,2-c]pyrazoles described in the foregoing structures form salts such as the hydrochloride, sulfate, chlorate, perchlorate, picrate and trichloracetate, on treatment with the corresponding acid. Formation of crystalline salts, especially the hydrochloric salts, provides a means of isolating the pyrazole.

A further embodiment of our invention comprises novel pharmaceutical compositions containing the novel [3,2-c]-pyrazoles exemplified in the foregoing structures.

The following examples illustrate methods of carrying out the present invention but it is to be understood that these examples are given for purposes of illustration and not of limitation. Details of the above described reactions are to be found in the examples.

In these examples, the procedures are particularly described starting with 11β,17α,21-trihydroxy-16α-methyl-4-pregnene-3,20-dione, but the procedures are generally applicable to all of the starting materials defined by Compound I of the Flow Sheet, as well as the $\Delta^{4,6}$-analogues thereof.

For purposes of simplification only the "A" type structure (as illustrated in Compound IIIA) is shown in the Flow Sheet for Compounds IV through VIII; however, compounds having the "B" type structure (as illustrated in Compound III B) are likewise included.

FLOW SHEET

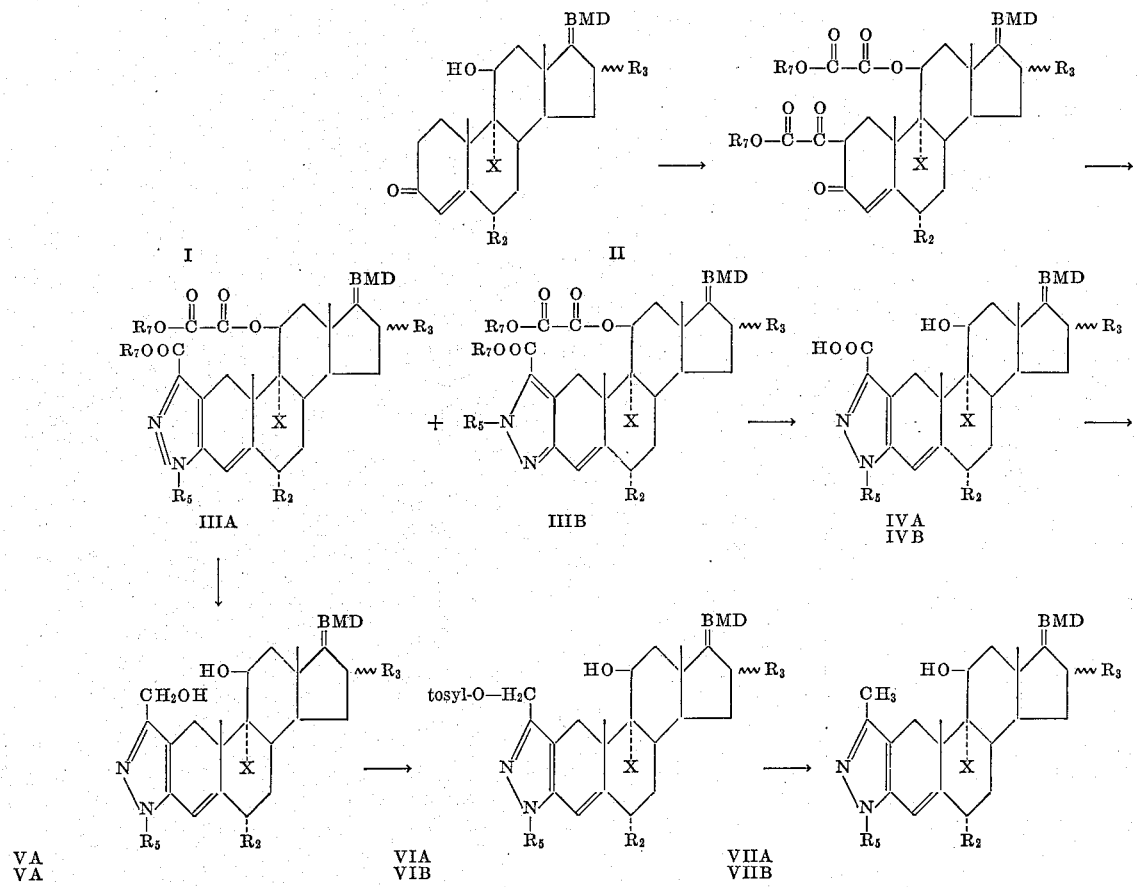

In the above structures BMD stands for the bis(methylenedioxy) group as shown in Compound VIII A.

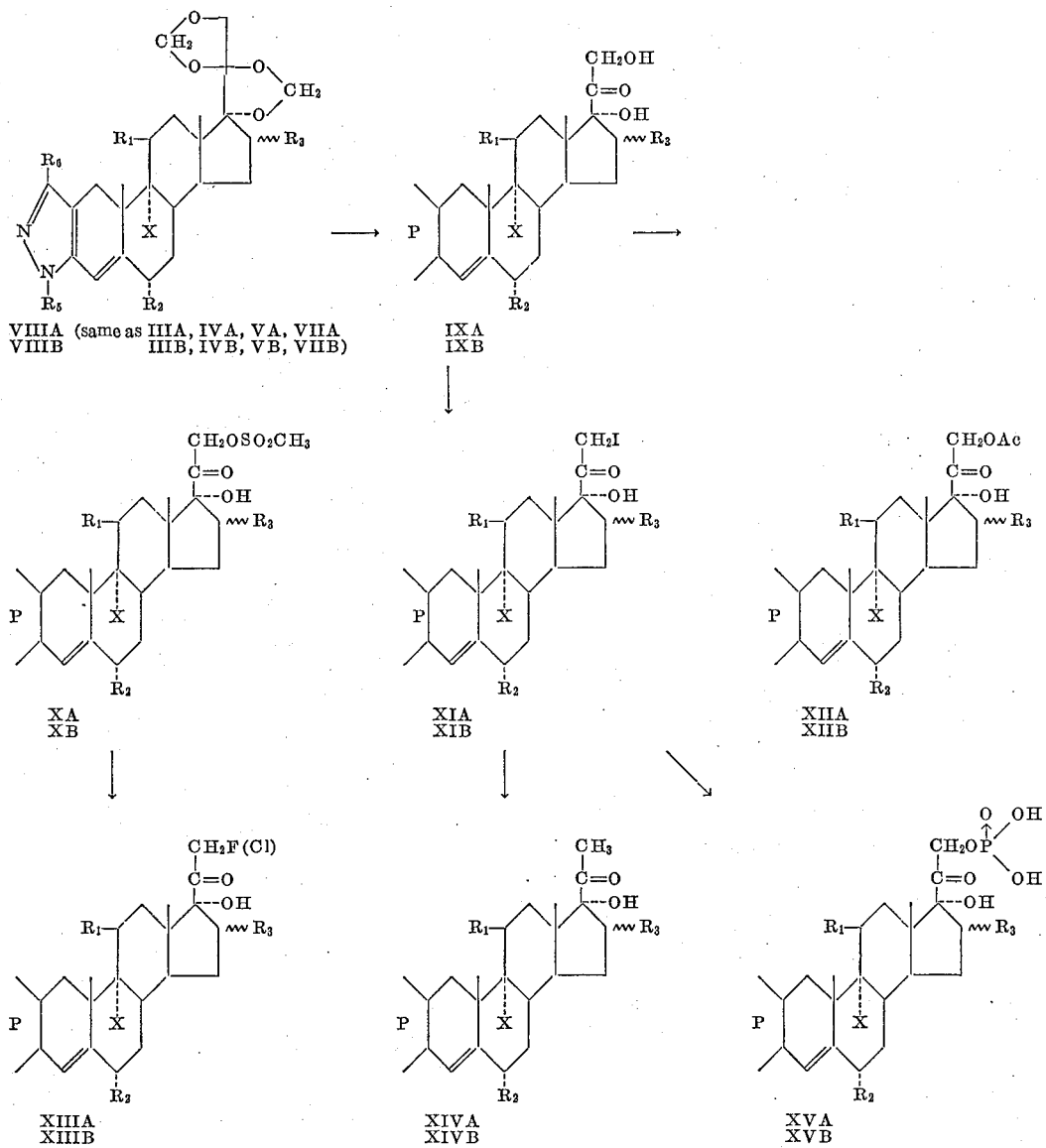

VIIIA (same as IIIA, IVA, VA, VIIA
VIIIB           IIIB, IVB, VB, VIIB)

IXA
IXB

XA
XB

XIA
XIB

XIIA
XIIB

XIIIA
XIIIB

XIVA
XIVB

XVA
XVB wherein $R_1$ is a member of the group consisting of hydrogen, β-hydroxy, alkoxalyloxy and keto; $R_2$ is a member of the group consisting of hydrogen, α-fluoro and α-methyl; $R_3$ is a member of the group consisting of hydrogen, α-methyl, β-methyl and methylene; $R_5$ is a member of the group consisting of hydrogen, alkyl, aralkyl, cycloalkyl, aryl, a heterocyclic nucleus, and substituted thereof; and $R_6$ is a member of the group consisting of alkoxycarbonyl, carboxyl, hydroxymethyl; and methyl; $R_7$ is a lower alkyl radical, and X is a member of the group consisting of hydrogen and halogen.

This Flow Sheet also includes the $\Delta^{4,6-}$ analogues of the compounds shown. The broken ring designated as "P" is the pyrazole ring. The structure of the pyrazole ring in the "A" compounds being the same as that of compound III-A and the structure of the pyrazole ring in the "B" compounds being the same as that of compound III-B.

In the above Flow Sheet Compound I is shown with an 11β-hydroxy-group in order to shown the transformations which take place in Compound I to V when a 11β-hydroxy group is present. However, Compound I may also have a hydrogen or a keto group at the 11-position, in which instance Compounds IV, V, VI and VII would have the same group at the 11-position as is present in Compound I. In Compound II there may be the compound shown and/or a mixture of this compound with the 11β–OH analogue.

EXAMPLE 1

To a suspension of 25.0 g. of 11β,17α,21-trihydroxy-16α-methyl-4-pregnene - 3,20 - dione in 1.5 liter of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting materials by paperstrip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21-bis(methylenedioxy)-

11β-hydroxy-16α-methyl-4-pregnene-3-one which is used in the subsequent step of the synthesis without further purification.

Sodium methoxide (prepared by heating sodium and methanol at 170° C. for 3 hours), 3.7 g. and 150 ml. of distilled diethyl oxalate are stirred under nitrogen for about 15 minutes. 4 grams of 17α,20,20,21-bis(methylenedioxy)-11β-hydroxy-16α-methyl-4-pregnene-3-one is added and the mixture is stirred under nitrogen at room temperature for 4 hours. The product is poured into 100 ml. of cold water, acidified with a saturated aqueous solution of sodium dihydrogen phosphate and extracted three times with 100 ml. portions of ether. The ether extracts are washed two times with 2% sodium hydroxide solution, and then two times with 50 ml. portions of water. The ether extract is dried over magnesium sulfate and filtered. The ether is then removed under vacuum on a steam bath and the residual diethyl oxalate is removed by vacuum distillation under nitrogen using an oil bath heated to 100–110° C. The dark oil is triturated with 1.0 ml. of ethanol. The crystalline product is filtered, washed with cold ethanol and the n-hexane, and then dried in an Abderhalden to give 17α,20,20,21-bis-(methylenedioxy)-2-ethoxalyl - 11β - ethoxalyloxy-16α-methyl-4-pregnene-3-one.

EXAMPLE 2

A 200 mg. portion of 17α,20,20,21 - bis(methylenedioxy)-2-ethoxalyl - 11β - ethoxalyloxy - 16α - methyl-4-pregnene-3-one, (0.33 millimoles) is treated with 6.0 ml. of ethanol, and then with 1.0 ml. of a solution of phenylhydrazine (0.365 ml.) in 10 ml. of ethanol. The mixture is heated at the reflux temperature under nitrogen temperature for one hour. Removal of the solvent by heating on a steam bath gives a yellow gum which is stirred with 8.0 ml. of water, filtered and washed three times with 3 ml. portions of water. The product is then dried in an Abderhalden for 2 hours at the boiling temperature of acetone to give a mixture, the major component of which is the 2'-phenyl-17α,20,20,21-bis(methylenedioxy) - 11β - ethoxyalyloxy - 5' - ethoxycarbonyl-16α-methyl-4-pregneno-[3,2-c]pyrazole.

In accordance with the above procedure, but reacting with hydrazine, in place of phenylhydrazine the product obtained is 17α,20,20,21 - bis(methylenedioxy) - 11β-ethoxyalyloxy - 5' - ethoxycarbonyl - 16α - methyl-4-pregneno-[3,2-c]pyrazole.

In accordance with the above procedure, but reacting with any of the monosubstituted hydrazines listed in column 2, the corresponding 1' and/or 2'-substituted-17α,20,20,21-bis(methylenedioxy) - 11β - ethoxyalyloxy - 5'-ethoxycarbonyl - 16α - methyl - 4 - pregneno-[3,2-c] pyrazoles are obtained.

EXAMPLE 3

The 17α,20,20,21-bis(methylenedioxyl - 11β-ethoxyalyloxy-5'-ethoxycarbonyl-16α-methyl - 2'-phenyl-4-pregneno-[3,2-c]pyrazole (100 mg.) is dissolved in ethanol and treated with 3 ml. of a solution of 200 mg. of potassium hydroxide in 10 ml. of ethanol. The mixture is heated at reflux temperature under nitrogen for one hour, whereupon potassium oxalate separates. The product is filtered and washed with cooled ethanol. The filtrate is taken to dryness to give an amorphous residue which is dissolved in 50 ml. of water and extracted with 10 ml. of ether. The aqueous extract is acidified with saturated sodium dihydrogen phosphate and extracted three times with 20 ml. of ether. The ether extract is dried over magnesium sulfate, is filtered and the solvent removed. The residue is dried to afford 17α,20,20,21-bis(methylenedioxy)-5'-carboxy-11β-hydroxy-16α-methyl - 2'-phenyl-4-pregneno-[3,2-c]pyrazole.

Eighty milligrams of 17α,20,20,21-bis(methylenedioxy)-5'-carboxy-11β-hydroxy-16α-methyl - 2' - phenyl-4-pregneno-[3,2-c]pyrazole is treated with 5.0 ml. of 60% formic acid and heated on a steam bath under nitrogen for thirty-five minutes. The reaction product is then cooled to room temperature. The formic acid is removed in vacuo at steam bath temperature. About 5 ml. of water is added. The product separates and is filtered, washed well with water and dried under vacuum to give 5' - carboxy-11β,17α,21 - trihydroxy-16α-methyl-20-oxo-2'-phenyl-4-pregneno-[3,2-c]pyrazole.

EXAMPLE 4

A 500 mg. portion of 17α,20,20,21-bis(methylenedioxy)-11β-ethoxyalyloxy-5'-ethoxycarbonyl-16α-methyl-2'-phenyl-4-pregneno-[3,2-c]pyrazole is dissolved in 30 ml. of dioxane which has been distilled over sodium, and treated with 285 mg. of lithium aluminum hydride. The mixture is heated at the reflux temperature for three hours and forty-five minutes. The product is allowed to cool to room temperature, and then cooled further in ice. Ethyl acetate is added to destroy the excess lithium aluminum hydride. A saturated salt solution is added until a granular deposit of salt is formed; then the insoluble salts are filtered off. Ether (10 ml.) is added and the ether layer is separated and washed with a 5 ml. portion of saturated salt solution. The organic phase is dried over magnesium sulfate, filtered, and the solvent removed in vacuo. The crude product is dissolved in chloroform. The chloroform is removed on a steam bath and the product is dried in an Abderhalden at the boiling point of acetone to give 17α,20,20,21-bis(methylenedioxy)-11β-hydroxy-5'-hydroxymethyl-2'-phenyl - 16α-methyl-4-pregneno-[3,2-c]pyrazole.

One hundred mg. 17α,20,20,21-bis(methylenedioxy)-11β-hydroxy-5'-hydroxymethyl - 16α-methyl-4-pregneno-[3,2-c]pyrazole is treated with 5.0 ml. of 60% formic acid and heated on the steam bath under nitrogen for forty minutes. A slightly insoluble product separates and is filtered off. The mother liquor is heated on the steam bath in vacuo to remove excess acid. About 5 ml. of water is added and the product that separates is filtered and washed well with water. The residue is dried in an Abderhalden at the boiling temperature of acetone for two hours at room temperature to give 66.4 mg. of crude product, which is dissolved in about 10 ml. of ether to which a small amount of methanol has been added. About 60 mg. of Darco G–60 (a decolorizing carbon) is added and the mixture is stirred at room temperature for two hours and then filtered through a mat of Super-Cel (an infusorial earth). The solvent is removed to give 11β,17α,21-trihydroxy-5'-hydroxymethyl-16α-methyl-20-oxo-2'-phenyl - 4 - pregneno - [3,2-c]pyrazole.

EXAMPLE 5

To a solution of 85 mg. of 17α,20,20,21-bis(methylenedioxy)-11β-hydroxy-5'-hydroxymethyl - 16α - methyl-2'-phenyl-4-pregneno-[3,2-c]pyrazole in 0.5 ml. of pyridine, cooled to 0° C., is added 0.03 ml. of tosyl chloride. The resulting mixture is allowed to stand at room temperature over night. Water is then added to the reaction mixture and the precipitate which forms is recovered by filtration, washed with water, and dried to give the 17α,20,20,21-bis(methylenedioxy) - 11β-hydroxy-16α-methyl-5'-tosyloxymethyl - 2'-phenyl - 4 - pregneno-[3,2-c] pyrazole.

EXAMPLE 6

A 500 mg. portion of 17α,20,20,21-bis(methylenedioxy)-11β-hydroxy - 5'-tosyloxymethyl - 16α - methyl-2'-phenyl-4-pregneno-[3,2-c]pyrazole is dissolved in 30 ml. of dioxane which has been distilled over sodium, and treated with 285 mg. of lithium aluminum hydride. The mixture is heated at the reflux temperature for about 4 hours. The product is allowed to cool to room temperature, and then cooled further in ice. Ethyl acetate is added to destroy the excess lithium aluminum hydride. A saturated salt solution is added until a granular deposit of salt is formed; then the insoluble salts are filtered off. Ether (10 ml.) is added and the ether layer is separated and washed with a 5 ml. portion of saturated salt solution. The organic phase is dried over magnesium sulfate, filtered, and the solvent removed in vacuo. The crude product is dissolved in chloroform. The chloroform is removed on a steam bath and the product is dried in Abderhalden to the boiling point of acetone to give 17α,20,20,21-bis(methylenedioxy)-11β-hydroxy-5',16α-dimethyl-2'-phenyl-4-pregneno-[3,2-c]pyrazole.

EXAMPLE 7

The following procedures are particularly described starting with 17α,20,20,21-bis(methylenedioxy)-11β-hydroxy-5',16α-dimethyl-2'-phenyl-4-pregneno-[3,2-c]pyrazole, but are generally applicable to all of the compounds defined by Compounds VIII-A and VIII-B of the Flow Sheet wherein $R_5$ is a substituent other than hydrogen.

A suspension containing 80 mg. of 17α,20,20.21-bis(methylenedioxy) - 11β - hydroxy-5',16α-dimethyl-2'-phenyl-4-pregneno[3,2-c]pyrazole and 8 cc. of 60% aqueous formic acid is heated inside a steam cone for 40 minutes. The resulting solution is cooled and extracted with chloroform. The chloroform layer is washed with aqueous sodium bicarbonate solution, dried over sodium sulfate and concentrated under vacuum. The crude concentrate is dried by azeotropic distillation with benzene and then subsequently treated for 15 minutes with 0.07 milliequivalents of sodium methoxide in 1.0 ml. of methanol in water to cleave any formate esters. Isolation by crystallization affords the 11β,17α,21-trihydroxy-5',16α - dimethyl-20-oxo-2'-phenyl-4-pregneno-[3,2-c]pyrazole. After neutralization with acetic acid the solution is diluted with water and extracted with chloroform. The chloroform layer is dried over sodium sulfate and concentrated under vacuum. The material is acetylated with acetic anhydride in pyridine, and chromatographed on silica gel. The column is eluted with ether chloroform mixtures to obtain 11β,17α,21-trihydroxy-5',16α-dimethyl - 20 - oxo-2'-phenyl-4-pregneno-[3,2-c]pyrazole 21-acetate.

The 11β,17α-21-trihydroxy-5',16α-dimethyl-20-oxo-2'-phenyl-4-pregneno-[3,2-c]pyrazole is treated with a mixture of 1.5 ml. of pyridine and 1.5 ml. of acetic anhydride and the mixture is allowed to stand at room temperature over night. The solvents are removed under vacuum, water is added and the 11β,17α,21-trihydroxy-5',16α - dimethyl-20-oxo-2'-phenyl-4-pregneno-[3,2-c]pyrazole 21-acetate is removed by filtration. After drying, the compound is dissolved in methylene chloride, a few drops of 2.5 N HCl are added and the mixture is taken to dryness. The resulting 11β,17α,21-trihydroxy-5',16α-dimethyl-20-oxo-2'-phenyl-4-pregneno-[3,2-c]pyrazole 21-acetate hydrochloride salt is purified by recrystallization.

In accordance with the above procedure, but adding an equivalent amount of sulfuric acid, chloric acid, perchloric acid, picric acid or trichloroacetic acid in place of the hydrochloric acid the corresponding sulfate, chlorate, perchlorate, picrate or trichloroacetate salt is formed.

The 11β,17a,21-trihydroxy-5',16α-dimethyl-20-oxo-2'-phenyl-4-pregneno-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the 11β,17α, 21 - trihydroxy - 5',16α-dimethyl-20-oxo-2'-phenyl-4-pregneno-[3,2-c]pyrazole 21-mesylate.

To a solution of 62 mg. of 11β,17α-21-trihydroxy-5', 16α - dimethyl-20-oxo-2'-phenyl-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy - 11β - hydroxy-5',16α-dimethyl-20-oxo-2'-phenyl-4-pregneno-[3,2-c]pyrazole and 21-fluoro-11β,17α-dihydroxy - 5',16α - dimethyl - 20 - oxo-2'-phenyl-4-pregneno-[3,2-c]pyrazole, which compounds are separated by partition chromatography, or by chromatography on silica gel.

A mixture of 11β,17α,21-trihydroxy-5',16α-dimethyl-20-oxo-2'-phenyl-4-pregneno-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the 21-chloro-11β, 17α,21 - trihydroxy - 5',16α-dimethyl-20-oxo-2'-phenyl-4-pregneno-[3,2-c]pyrazole.

The 11β,17α,21-trihydroxy-5',16α-dimethyl-20-oxo-2'-phenyl-4-pregneno-[3,2-c]pyrazole 21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 11β,17α-dihydroxy-21-iodo-5',16α-dimethyl-20-oxo-2'-phenyl-4-pregneno-[3,2-c]pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The 11β,17a-dihydroxy-5',16a-dimethyl-20-oxo-2'-phenyl-4-pregneno-[3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 11β,17α - dihydroxy - 21-iodo-5',16α-dimethyl-20-oxo-2'-phenyl-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultra-violet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR-120") in its hydrogen form. The column is washed with methanol until the washings contain no ultra-violet absorbing material. The combined eluate and washings are concentrated to a volume of 15 ml., and 150 ml. of ether are added. The precipitate which forms is recovered by filtration, washed with ether, and dried for about 16 hours in a desiccator, to give 11β,17α-dihydroxy-5',16α - dimethyl - 20 - oxo-2'-phenyl-4-pregneno-[3,2-c] pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

In accordance with all of the above procedures, but starting with any of the 5'-substituted-17α,20,20,21-bis-(methylenedioxy)-steroid products defined by Compounds VIII-A and VIII-B, of the corresponding 21-hydroxy, 21-acyloxy, 21-phosphates, 21-desoxy, 21-chloro, and 21-fluoro derivatives are obtained.

EXAMPLE 8

The following procedures are particularly described starting with 17α,20,20,21-bis(methylenedioxy)-11β-hydroxy-5',16α-dimethyl-4-pregneno-[3,2-c]pyrazole, but are generally applicable to all of the starting materials defined by Compounds VIII-A and VIII-B of the Flow Sheet wherein $R_5$ is hydrogen.

The 17α,20,20,21-bis(methylenedioxy)-11β-hydroxy-5', 16α-dimethyl-4-pregneno-[3,2-c]pyrazole (720 mg.) is heated in a steam bath with 24 ml. of a 60% aqueous solution of formic acid for about 30 minutes. The excess reagent is removed under vacuum using a water bath at about 50° C. as the source of heat. The residue is flushed four times with n-hexane and then dried at 60° C. in high vacuum to given an amorphous solid which is a mixture of 11β,17α,21-trihydroxy-5',16α-dimethyl-20-oxo-4-pregneno-[3,2-c]pyrazole and 21-formyloxy-11β,17α-dihydroxy - 5',16α-dimethyl-20-oxo-4-pregneno[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21-trihydroxy-5', 16α-dimethyl-20-oxo-4-pregneno-[3,2-c]pyrazole.

To a solution of 100 mg. of the above product in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl-11β,17α,21-trihydroxy-5', 16α-dimethyl-20-oxo-4-pregneno-[3,2-c]pyrazole 21-acetate is then isolated by addition of water and filtration.

In accordance with the above procedure, but starting with the 11β,17α,21-trihydroxy-5',16α-dimethyl-20-oxo-4-pregneno-[3,2-c]pyrazole and using two milliequivalents of another acylating agent there is obtained the corresponding N - acyl-11β,17α,21-trihydroxy-5',16α-dimethyl-20-oxo-4-pregneno-[3,2-c]pyrazole 21-acylate.

A solution of 5.73 g. of N-acetyl-11β,17α,21-trihydroxy - 5',16α - dimethyl-20-oxo-4-pregneno-[3,2-c]pyrazole 21-acetate in 60 ml. of 80% (v./v) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 11β,17α,21-trihydroxy-5', 16α - dimethyl-20-oxo-4-pregneno-[3,2-c]pyrazole 21-acetate.

To a solution of 3.70 g. of 11β,17α,21-trihydroxy-5', 16α - dimethyl-20-oxo-4-pregneno-[3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of the N-carbamyl-11β,-17α,21-trihydroxy - 5',16α-dimethyl-20-oxo-4-pregneno-[3,2-c]pyrazole 21-acetate is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-11β,17α,21-trihydroxy-5',16α-dimethyl-20-oxo-4-pregneno-[3,2-c]pyrazole.

To a solution of 85 mg. of the above product in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-11β,17α,21-trihydroxy-5',16α-dimethyl-20-oxo-4-pregneno-[3,2-c]pyrazole 21-mesylate.

A mixture of N-carbamyl-11β,17α,21-trihydroxy-5', 16α - dimethyl - 20 - oxo-4-pregneno-[3,2-c]pyrazole 21-mesylate (0.75 g.) lithium chloride (202 mg.) and dimethylformamide (30 ml.) are heated under reflux for 50 minutes, concentrated under vacuum to a small volume, and treated with water. The solid so formed is separated by filtration and recrystallized to afford the N - carbamyl-21-chloro-11β,17α-dihydroxy-5',16α-dimethyl-20-oxo-4-pregneno-[3,2-c]pyrazole.

To a solution of 62 mg. of N-carbamyl-11β,17α,21-trihydroxy - 5',16α - dimethyl-20-oxo-4-pregneno-[3,2-c] pyrazole 21-mesylate in 1 ml. of freshly distilled anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21-epoxy-11β-hydroxy-5',16α-dimethyl-20-oxo-4-pregneno-[3,2-c]pyrazole and N-carbamyl - 21 - fluoro-11β,17α-dihydroxy-5',16α-dimethyl-20-oxo-4-pregneno-[3,2-c]pyrazole, which compounds are separated by partition chromatography or by chromatography on silica gel.

To 180 mg. of N-carbamyl-11β,17α,21-trihydroxy-5', 16α - dimethyl - 20 - oxo - 4-pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-11β,17α-dihydroxy-21-iodo-5',16α-dimethyl-20-oxo-4-pregneno-[3,2-c]pyrazole.

The N - carbamyl - 11β,17α - dihydroxy - 21 - iodo-5',16α - dimethyl - 20 - oxo - 4 - pregneno - [3,2 - c] pyrazole (200 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-carbamyl-11β,17α - dihydroxy - 5',16α - dimethyl - 20 - oxo - 4-pregneno-[3,2-c]pyrazole.

Silver dihydrogen phosphate is prepared by the reaction of 32 g. of trisilver phosphate with 10 ml of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-11β,17α-dihydroxy-21-iodo-5′,16α-dimethyl-20-oxo-4-pregneno - [3,2 - c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-carbamyl-11β,17α-dihydroxy - 5′,16α - dimethyl - 20 - oxo - 4 - pregneno-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 355 mg. of N-carbamyl-11β,17α-dihydroxy - 5′,16α - dimethyl - 20 - oxo - 4 - pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 11β,17α - dihydroxy - 5′,16α - dimethyl - 20 - oxo - 4-pregneno - [3,2 - c]pyrazole.

In accordance with the above procedure, but starting with the N-carbamyl-21-fluoro-(or 21-chloro-)-11β,17α - dihydroxy - 5′,16α- - dimethyl - 20 - oxo - 4-pregneno-[3,2-c]pyrazole there is obtained the 21-fluoro-(or 21 - chloro) - 11β,17α - dihydroxy - 5′,16α - dimethyl-20-oxo-4-pregneno-[3,2-c]pyrazole.

In accordance with all of the above procedures, but starting with any of the 2′-unsubstituted-17α,20,20,21-bis(methylenedioxy)-steroid products defined by Compounds VIII–A and VIII–B of the Flow Sheet, the corresponding 21-hydroxy, 21-acyloxy, 21-phosphates, 21-desoxy, 21-chloro, and 21-fluoro derivatives are obtained.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group of compounds having structural formulas A and B, and the $\Delta^{4,6}$-analogues thereof:

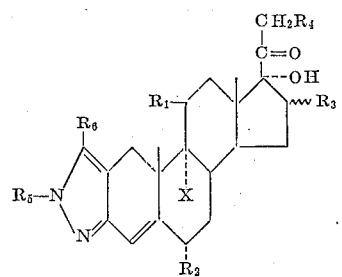

A

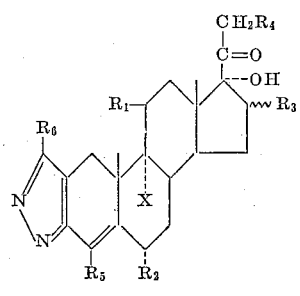

B wherein $R_1$ is a member of the group consisting of hydrogen, β-hydroxy and keto; $R_2$ is a member of the group consisting of hydrogen, α-fluoro and α-methyl; $R_3$ is a member of the group consisting of hydrogen, α-methyl, β-methyl and methylene; $R_4$ is a member of the group consisting of hydrogen, hydroxy, lower hydrocarbon carboxylic acyloxy, chloro, fluoro, iodo, the dihydrogen phosphate and the alkali metal salts of said dihydrogen phosphate, and the methylsulfonyloxy-radical; $R_5$ is a member of the group consisting of hydrogen, lower alkyl, lower aralkyl, lower hydrocarbon aryl, lower hydrocarbon carboxylic acyl halophenyl, lower alkoxy phenyl, nitrophenyl, pyridyl, pyridyl oxide and pyrimidyl; $R_6$ is a member of the group consisting of lower alkoxycarbonyl, carboxyl and hydroxymethyl; and X is a member of the group consisting of hydrogen and halogen.

2. A compound having the structural formula, and the $\Delta^{4,6}$-analogues thereof:

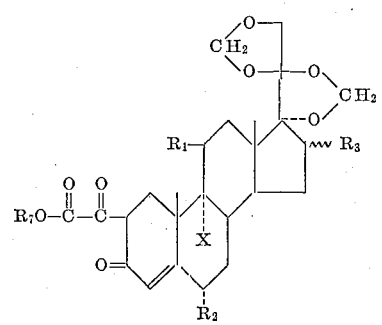

wherein $R_1$ is a member of the group consisting of hydrogen, β-hydroxy, β-lower alkoxalyloxy and keto; $R_2$ is a member of the group consisting of hydrogen, α-fluoro and α-methyl; $R_3$ is a member of the group consisting of hydrogen, α-methyl, β-methyl and methylene; $R_7$ is lower alkyl and X is a member of the group consisting of hydrogen and halogen.

3. A compound selected from the group of compounds having structural formulas A and B, and the $\Delta^{4,6}$-analogues thereof:

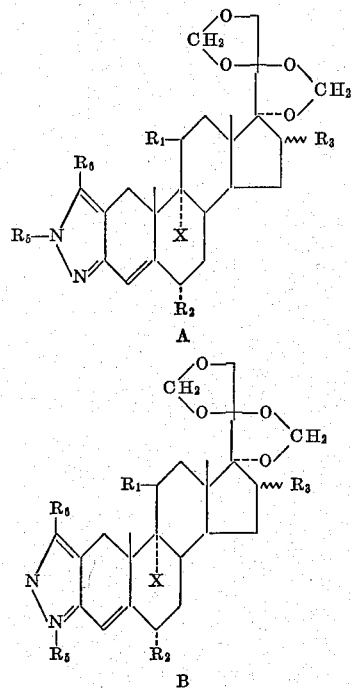

A

B wherein $R_1$ is a member of the group consisting of hydrogen, $\beta$-lower alkoxalyloxy, $\beta$-hydroxy and keto; $R_2$ is a member of the group consisting of hydrogen, $\alpha$-fluoro and $\alpha$-methyl; $R_3$ is a member of the group consisting of hydrogen, $\alpha$-methyl, $\beta$-methyl and methylene; $R_5$ is a member of the group consisting of hydrogen, lower alkyl, lower aralkyl, lower hydrocarbon aryl, lower hydrocarbon carboxylic acyl, halophenyl, lower alkoxy phenyl, nitrophenyl, pyridyl, pyridyl oxide and pyrimidyl; $R_6$ is a member of the group consisting of lower alkoxycarbonyl, carboxyl and hydroxymethyl; and X is a member of the group consisting of hydrogen and halogen.

4. The process which comprises reacting a compound having the following structure, and the $\Delta^{4,6}$-analogues thereof:

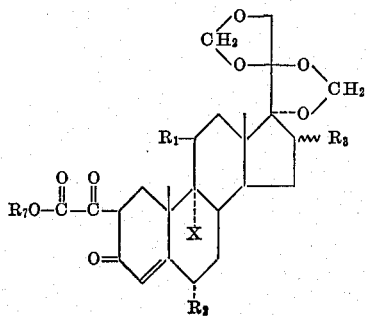

wherein $R_1$ is a member of the group consisting of hydrogen, $\beta$-hydroxy, $\beta$-lower alkoxalyloxy and keto; $R_2$ is a member of the group consisting of hydrogen, $\alpha$-fluoro and $\alpha$-methyl; $R_3$ is a member of the group consisting of hydrogen, $\alpha$-methyl, $\beta$-methyl and methylene; $R_7$ is a lower alkyl radical; and X is a member of the group consisting of hydrogen, and halogen with a compound which is a member of the group consisting of hydrazine, lower alkylhydrazines, lower cycloalkylhydrazines, lower aralkylhydrazines, lower hydrocarbon arylhydrazines and salts thereof, in an inert atmosphere to form compounds having structures A and B, and the $\Delta^{4,6}$-analogues thereof:

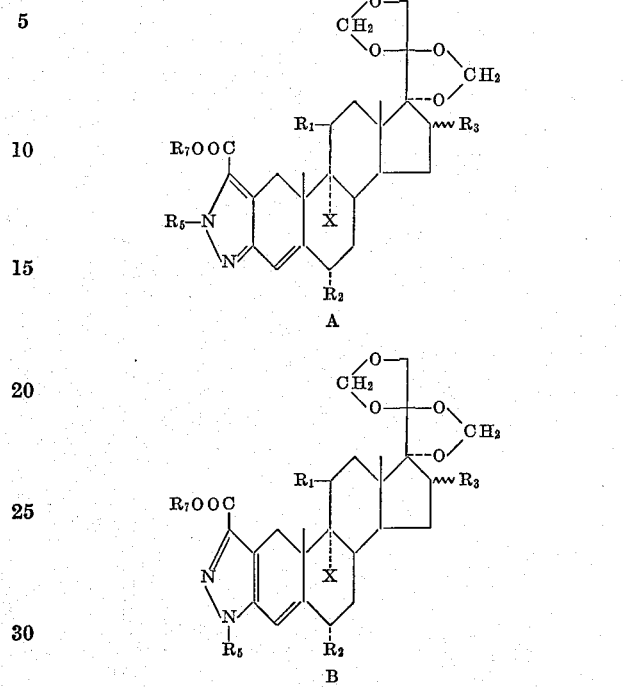

A

B wherein $R_1$, $R_2$, $R_3$, and X have the meaning above defined, $R_5$ is a member of the group consisting of hydrogen, lower alkyl, lower cycloalkyl, lower aralkyl and lower hydrocarbon aryl, and $R_7$ is a lower alkyl radical.

5. 5'-carboxy-11$\beta$,17$\alpha$,21-trihydroxy-16$\alpha$-methyl-20-oxo-2'-phenyl-4-pregneno-[3,2-c]pyrazole.

6. 11$\beta$,17$\alpha$,21-trihydroxy-5'-hydroxymethyl-16$\alpha$-methyl-20-oxo-2'-phenyl-4-pregneno-[3,2-c]pyrazole.

7. 11$\beta$,17$\alpha$,21-trihydroxy-5'-hydroxymethyl-6,16$\alpha$-dimethyl-20-oxo-4,6-pregnadieno-[3,2-c]pyrazole.

8. 11$\beta$,17$\alpha$,21-trihydroxy-5'-hydroxymethyl-6$\alpha$,16$\beta$-dimethyl-20-oxo-2'-phenyl-4-pregneno-[3,2-c]pyrazole.

9. 6$\alpha$ - fluoro - 11$\beta$,17$\alpha$,21 - trihydroxy - 2' - (p-fluorophenyl) - 5' - hydroxymethyl - 16$\alpha$ - methyl - 11,20 - dioxo-4-pregneno-[3,2-c]pyrazole.

10. 11$\beta$,17$\alpha$,21-trihydroxy-5'-hydroxymethyl-2',16$\beta$-dimethyl-20-oxo-4-pregneno-[3,2-c]pyrazole.

11. 9$\alpha$ - fluoro - 2' - (p-fluorophenyl) - 11$\beta$,17$\alpha$,21-trihydroxy - 5' - hydroxymethyl - 16$\alpha$ - methyl - 20 - oxo-4-pregneno-[3,2-c]pyrazole.

12. 11$\beta$,17$\alpha$,21-trihydroxy-5'-hydroxymethyl-6$\alpha$-methyl-20-oxo-2'-phenyl-4-pregneno-[3,2-c]pyrazole.

References Cited by the Examiner
UNITED STATES PATENTS

| | | | |
|---|---|---|---|
| 3,067,193 | 12/1962 | Tishler et al. | 260—239.5 |
| 3,067,194 | 12/1962 | Tishler et al. | 260—239.5 |
| 3,096,327 | 7/1963 | Harnik | 260—239.5 |
| 3,135,743 | 6/1964 | Clinton et al. | 260—239.55 |

OTHER REFERENCES

Fried et al., J.A.C.S. 85, pp. 236–38, Jan. 1963.
Hirschmann et al., J.A.C.S. 85, pp. 120–22, Jan. 1963.

LEWIS GOTTS, *Primary Examiner.*

HENRY A. FRENCH, *Assistant Examiner.*